(12) United States Patent
Samukawa et al.

(10) Patent No.: US 7,404,435 B2
(45) Date of Patent: Jul. 29, 2008

(54) AIR CONDITIONER FOR VEHICLE USE (75) Inventors: Katsuhiko Samukawa, Okazaki (JP); Masashi Ino, Nagoya (JP)

(73) Assignee: Denso Corporation, Kariya (JP)

( * ) Notice: Subject to any disclaimer, the term of this patent is extended or adjusted under 35 U.S.C. 154(b) by 555 days.

(21) Appl. No.: 11/190,164

(22) Filed: Jul. 26, 2005

(65) Prior Publication Data
US 2006/0027352 A1 Feb. 9, 2006

(30) Foreign Application Priority Data
Jul. 27, 2004 (JP) .............................. 2004-218545

(51) Int. Cl.
B60H 1/00 (2006.01)

(52) U.S. Cl. ........................ 165/204; 165/202; 165/232; 165/244; 62/244; 62/228.1; 62/229

(58) Field of Classification Search .................. 165/202, 165/203, 204, 232, 244; 62/244, 228.1, 229
See application file for complete search history.

(56) References Cited
U.S. PATENT DOCUMENTS
5,299,431 A * 4/1994 Iritani et al. ................... 62/243

6,123,267 A * 9/2000 Baker et al. .................. 165/204
6,463,998 B1 * 10/2002 Shindo ........................ 165/204

FOREIGN PATENT DOCUMENTS
JP         60-4409        1/1985

* cited by examiner

Primary Examiner—Ljiljana (Lil) V Ciric
(74) Attorney, Agent, or Firm—Harness, Dickey & Pierce, PLC (57) ABSTRACT An air conditioner for automotive vehicle use intended to prevent a defrosting operation in an instantaneous foot-defroster mode. The DEF mode in which air mainly from a DEF opening is blown toward the windshield is set by an exclusive front DEF switch. The F/D mode for blowing a substantially equal amount of air to the windshield and the feet of the occupants from the DEF opening and the FOOT opening, respectively, together with the other blow modes (FACE, B/L, FOOT), are sequentially switched for each operation of the blow mode switch in a predetermined sequence. In the case where the F/D mode is selected, the air condition control operation is not performed nor is the blow mode displayed in F/D mode before the lapse of a predetermined length of time (about 1 second). In the case where the blow mode other than F/D mode is desired, therefore, the unrequired control operation in F/D mode is not performed and the instantaneous change is not displayed even though the F/D mode is unavoidably passed-through.

4 Claims, 7 Drawing Sheets

AIR CONDITIONER FOR VEHICLE USE

BACKGROUND OF THE INVENTION

1. Field of the Invention

This invention relates an air conditioner for automotive vehicle use.

2. Description of the Related Art

A conventional air conditioner for automotive vehicle use is disclosed in Japanese Unexamined Patent Publication No. 60-4409, wherein in the case where the vehicle window is frosted, an occupant depresses a switch (DEF switch) to blow the air from the defroster air outlet and thus to quickly blow off the frost from the vehicle window by increasing the air capacity from a minimum level.

In another conventional air conditioner for automotive vehicle use, in the case where an occupant selects a foot-defroster mode to blow air from both the foot air outlet and the defroster air outlet, the air capacity is increased or the refrigerant compressor for the evaporator is activated to blow the dehumidifying air or the internal-external air switching means is switched to external air side to quickly defrost the window.

The foot-defroster mode may be selected not by an exclusive switch such as the DEF switch to set the defroster mode but by a change-over switch to switch the air outlets. The air outlet change-over switch, however, is required to be depressed a plurality of times to select the foot-defroster mode by sequentially switching a plurality of blow modes. Therefore, the occupant, even if not desirous of the foot-defroster mode, is required to pass through the foot-defroster mode by the air outlet switching operation. In the process, a problem is posed that the foot-defroster mode operation is undesirably performed, though temporarily, to increase the air capacity or activate the compressor.

SUMMARY OF THE INVENTION

In view of this problem, the object of this invention is to provide an air conditioner for automotive vehicle use for preventing the window-defrosting function in the instantaneous foot-defroster mode.

In order to achieve the object described above, according to this invention, there is provided an air conditioner for automotive vehicle use comprising an air path (2) for blowing air into the passenger compartment by a blower (7), an internal-external air switching means (4) for introducing by switching the internal and the external airs into the air path, a heat exchanger (11) for cooling the air blown by a blower in the air path, a plurality of blow mode switching means (15a, 15b, 15c) for switching a plurality of blow modes by opening and closing a plurality of openings (15, 16, 17), respectively, for blowing air into the compartment from the air path, a blow mode setting means (30c) operated by an occupant to selectively set the blow mode, and an air condition control unit (22) for driving the blow mode switching means based on the set blow mode, wherein the blow mode includes a foot-defroster mode in which air is blown from both a defroster opening (15) toward the vehicle windows, and a foot opening (17) toward the feet of the occupants in the compartment, and the blower collaborates with at least one of the internal-external air switching means and the heat exchanger, and wherein the air condition control unit begins to execute the control operation in foot-defroster mode upon lapse of a predetermined time length from the time point when the foot-defroster mode is set by the setting means.

According to this invention, in the case where the blow mode selectively set by the occupant through the blow mode setting means is the foot-defroster mode, the control operation in foot-defroster mode is performed upon lapse of a predetermined length of time after the setting operation. Specifically, before the lapse of the predetermined time length, the control operation in foot-defroster mode is suspended and not performed. In the case where the foot-defroster mode is selected temporarily against the will of the occupant, therefore, none of the blower, the internal-external air switching means and the cooling heat exchanger is activated in foot-defroster mode within the predetermined time length and therefore the activation against the will of the occupant is prevented. In the case where the blow mode remains set in foot-defroster mode even after the lapse of the predetermined time length, however, the intention of the occupant is considered to lie in the setting of the foot-defroster mode and the control operation in foot-defroster mode is performed.

Further, according to the invention, the blow mode setting means includes a display means (31) for the occupant to recognize the set blow mode, and the display means displays the foot-defroster mode upon the lapse of a predetermined time from the time point when the blow mode is set to the foot-defroster mode. Before the lapse of the predetermined length of time, therefore, the foot-defroster mode is not displayed. Thus, the display against the will of the occupant, i.e. a display flicker is prevented.

According to the invention, the foot-defroster mode and the other blow modes are switched in a predetermined sequence (110). In the case where the blow mode setting means switches the blow mode setting in accordance with the switching sequence for each input operation by the occupant, therefore, the blow mode can be switched by simple operation. Also, in the case where the foot-defroster mode always passed through by the repeated operation of the blow mode setting means is against the will of the occupant, the control operation in the foot-defroster mode can be avoided within the range of a predetermined time length.

The blow mode setting means may be configured of a bilateral switch (300, 301) by which the blow mode is switched in accordance with the regular switching sequence for each input operation by the occupant in one direction, while the blow mode is switched in the opposite direction to the regular switching sequence for each input operation by the occupant in the other direction.

The reference numerals in the parentheses of each means described above indicate the correspondence with the specific means of the embodiments described below.

The present invention may be more fully understood from the description of preferred embodiments of the invention, as set forth below, together with the accompanying drawings.

DESCRIPTION OF THE PREFERRED EMBODIMENTS

Figure 1:
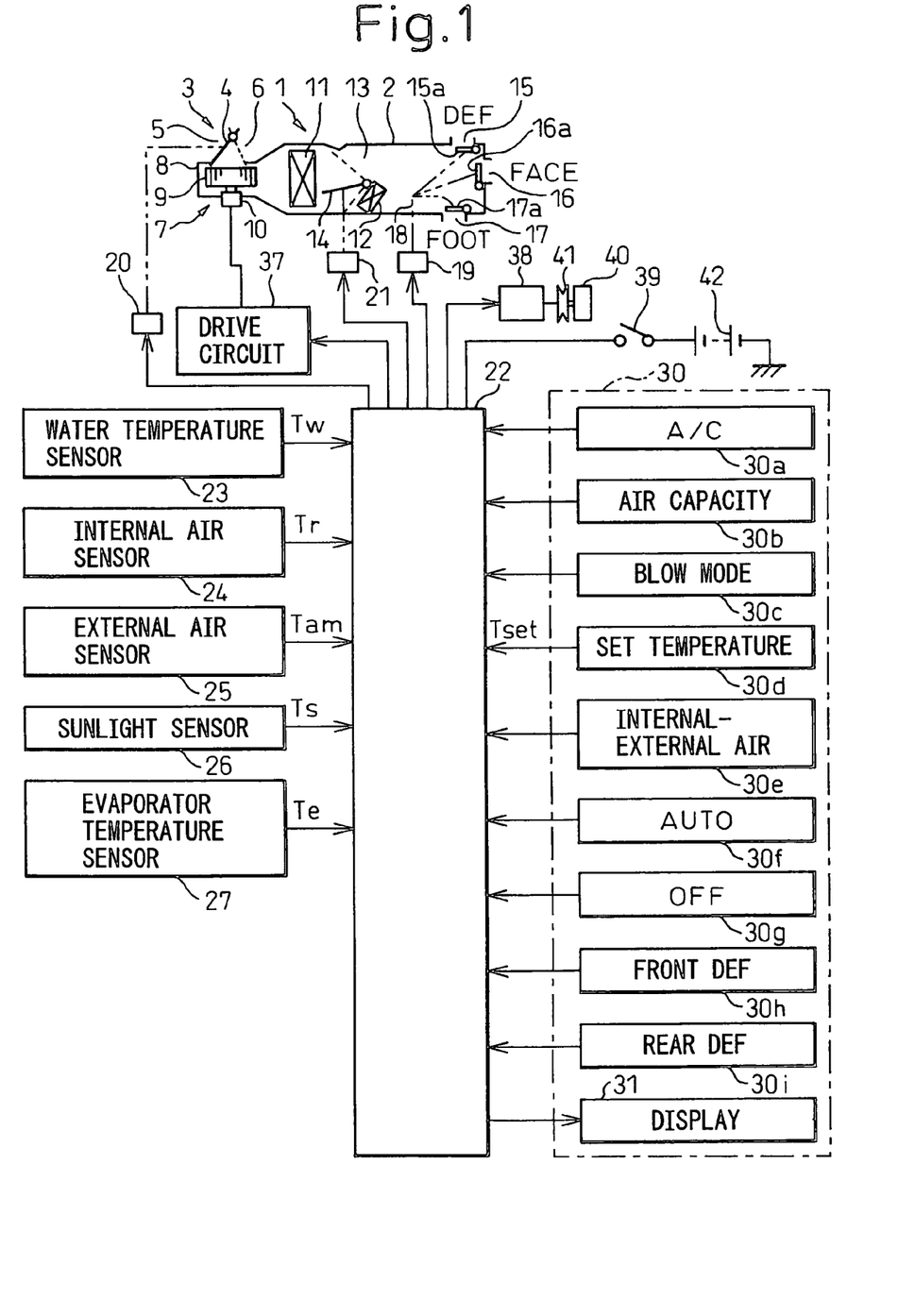
FIG. 1 shows a general configuration according to an embodiment of the invention.

An embodiment of the invention is explained below with reference to the drawings. FIG. 1 is a diagram showing a general configuration of this embodiment, in which the air-conditioning case 2 of an air conditioner 1 is arranged in the instrument panel in the front part of the compartment to form a path of the air flowing into the compartment. An internal-external air switching box 3 is arranged at the upstream end of the air-conditioning case 2. An internal air inlet 5 and an external air inlet 6 are opened or closed by an internal-external air switching door 4 as an internal-external air switching means in the internal-external air switching box 4. In this way, the air in the compartments (internal air) and the air outside the compartments (external air) are switched and introduced. A blower 7 is arranged downstream of the internal-external air switching box 3, and a centrifugal blow fan 9 adapted to be rotationally driven by a drive motor 10 is accommodated in the case 8 of the blower 7.

An evaporator 11 making up a cooling heat exchanger is arranged downstream of the blower 7. This evaporator 11 is arranged in the refrigeration cycle having a compressor 40 driven by a vehicle engine (not shown). The low-pressure refrigerant flowing into the evaporator 11 is evaporated by absorbing heat from the air from the blower 7 thereby to cool the blown air. The compressor 40 has an electromagnetic clutch 41 for interrupting power, and the power of the vehicle engine is transmitted through the electromagnetic clutch 41. The activation and deactivation of the evaporator 11, therefore, correspond to those of the compressor 40 driven by the electromagnetic clutch 41.

In the air-conditioning case 2, a hot-water heater core 12 making up a heating heat-exchanger for heating the air is arranged downstream of the evaporator 11 with the hot water (coolant) of the vehicle engine as a heat source. A bypass 13 is formed beside the hot-water heater core 12, and the air (cold air) flows bypassing the hot-water heater core 12.

A tabular air mix door 14 is rotatably arranged between the evaporator 11 and the heater core 12. The air mix door 14 makes up a temperature control means, and in accordance with the opening degree SW of the air mix door 14, the ratio of air capacity between the hot air passing through the hot-water heater core 12 and the cold air passing through the bypass 13 is adjusted, so that the temperature of the air blown into the compartment is controlled. The hot air from the hot-water heater core 12 and the cold air from the bypass 13 are mixed with each other downstream of the hot-water heater core 12 thereby to generate air of the desired temperature.

Further, a plurality of openings including a defroster opening 15, a face opening 16 and a foot opening 17 for blowing air into the compartments are exposed at the downstream end of the air-conditioning case 2. The defroster opening 15 is for blowing air onto the inner surface of the windshield of the vehicle through a defroster duct not shown and adapted to be opened or closed by a rotatable tabular defroster door 15a.

The face opening 16, on the other hand, is for blowing air to the upper half part of the body of the occupants in the compartment through a face duct not shown and adapted to be opened and closed by a rotatable tabular face door 16a. The foot opening 17 is for blowing air toward the feet of the occupants in the compartment through a foot duct not shown and adapted to be opened or closed by a rotatable tabular foot door 16a.

The blow mode doors including the defroster door 15a, the face door 16a and the foot door 17a make up a blow mode switching means. The blow mode doors 15a, 16a, 17a are connected to a common link mechanism 18, through which the blow mode doors 15a, 16a, 17a are driven by an electric drive unit 1 including a servo motor. The internal-external air switching door 4 and the air mix door 14 are also driven by electrical drive units 20, 21, respectively, configured of a servo motor.

According to this embodiment, the operation of the blow mode doors 15a, 16a, 17a sets the blow mode at any one of face (FACE), bilevel (B/L), foot (FOOT), foot-defroster (F/D) mode and defroster (DEF).

In face mode, the face opening 16 is opened fully and air is blown toward the upper half part of the bodies of the occupants in the compartment from the face opening 16. In B/L mode, on the other hand, both the face opening 16 and the foot opening 17 are opened to blow air toward the upper half part of the body and the feet of the occupants in the compartments. In foot mode, the foot opening 17 is opened full and the defroster opening 15 is opened to a small degree, so that air is blown mainly from the foot opening 17 while a small amount of air is blown from the defroster opening 15.

In F/D mode, the defroster opening 15 and the foot opening 17 are opened to about the same degree. As compared with FOOT mode, therefore, the blow air capacity from the foot opening 17 is reduced while increasing the air capacity blown from the defroster opening 15. In DEF mode, the defroster opening 15 is opened full so that the air is blown toward the inner surface of the windshield of the vehicle from the defroster opening 15. The setting and switching of these blow modes are described later.

Next, the electrical control unit according to this embodiment is briefly explained. An air-conditioning control unit (ECU) 22 is configured of a well-known microcomputer including a CPU, a ROM or a RAM and peripheral circuits. The air-conditioning control unit 22 is supplied with detection signals from a water temperature sensor 23, an internal air sensor 24, an external air sensor 25, a sunlight sensor 26 and an evaporator temperature sensor 27 for detecting the hot water temperature Tw, the internal air temperature Tr, the external air temperature Tam, the sunlight amount Ts and the evaporator blow temperature Te constituting the degree to which the evaporator is cooled, respectively.

The voltage applied to the fan drive motor 10 of the blower 7 is controlled by a drive circuit 37, so that the rotational speed of the blower 7 is adjusted to control the air capacity of the blower 7. Also, the electric power supplied to the electromagnetic clutch 41 of the compressor 40 is switched on and off by the drive circuit 38. The air-conditioning electronic control unit 22 is supplied with electric power from an on-vehicle battery 42 through an ignition switch 39 of the vehicle engine.

Further, an air-conditioning operation panel 30 arranged around the instrument board in the vehicle has the following-described operating members manually operated by the occupant. The operation signal of these operating members is also input to the air-conditioning control unit 22.

Figure 2:
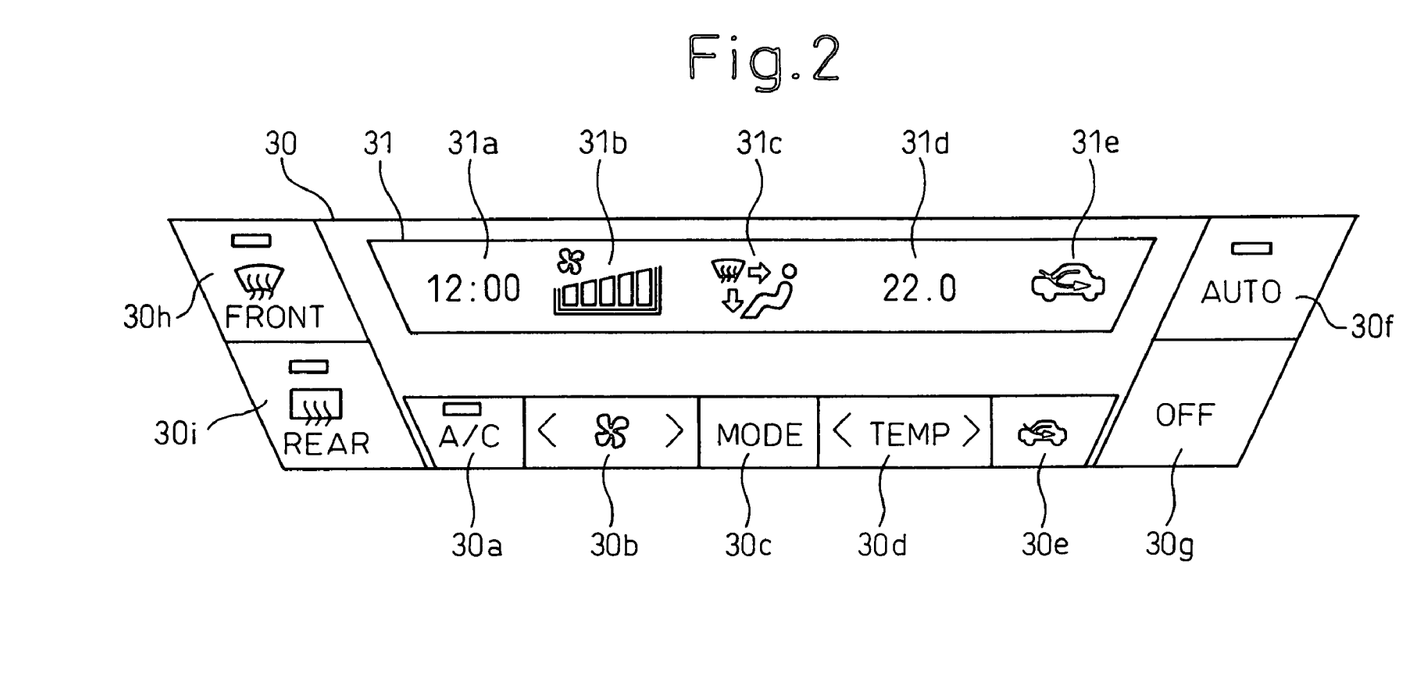
FIG. 2 is a diagram showing the outer appearance of an air-conditioning operation panel.

Specifically, as shown in FIG. 2, the operating members of the air-conditioning operation panel 30 include an air-conditioning switch 40a for generating an on-off signal of the electromagnetic clutch 41 of the compressor 40 in the refrigeration cycle, an air capacity switch 30b for generating an air capacity switching signal for the blower 7, a blow mode switch 30c for generating the blow mode switching signal described above, a temperature setting switch 30d for generating a temperature setting signal Tset, an internal-external air change-over switch 30e for generating an internal-external switching signal, and an auto switch 30f for setting the automatic air-conditioning control mode.

Further, the air-conditioning operation panel 30 includes an off switch 30g for giving an instruction to stop the air-conditioning operation, a front DEF switch 30h for designating the DEF mode manually and a rear DEF switch 30i to activate the heating coil of the rear window.

The air-conditioning operation panel 30 is also configured of a display unit 31 for making the occupants recognize the operating condition of the air conditioner, including a clock 31a, an air capacity display 31b for indicating the magnitude of air capacity, a blow mode display 31c, a temperature display 31d for switching and displaying the internal and external air temperature, and an internal-external air display 31e for displaying the internal air circulation or the external air introduction. All these component parts are controlled by the air-conditioning control unit 22.

The blow mode display 31c indicates the open state of the defroster opening 15, the face opening 16 and the foot opening 17 by the lighting of a windshield image, a horizontal arrow and a downward arrow, respectively showing the blow modes (FACE, B/L, FOOT, F/D, DEF). In DEF mode, the LED included in the front DEF switch 30h other than the blow mode display 31c is also turned on.

Figure 3:
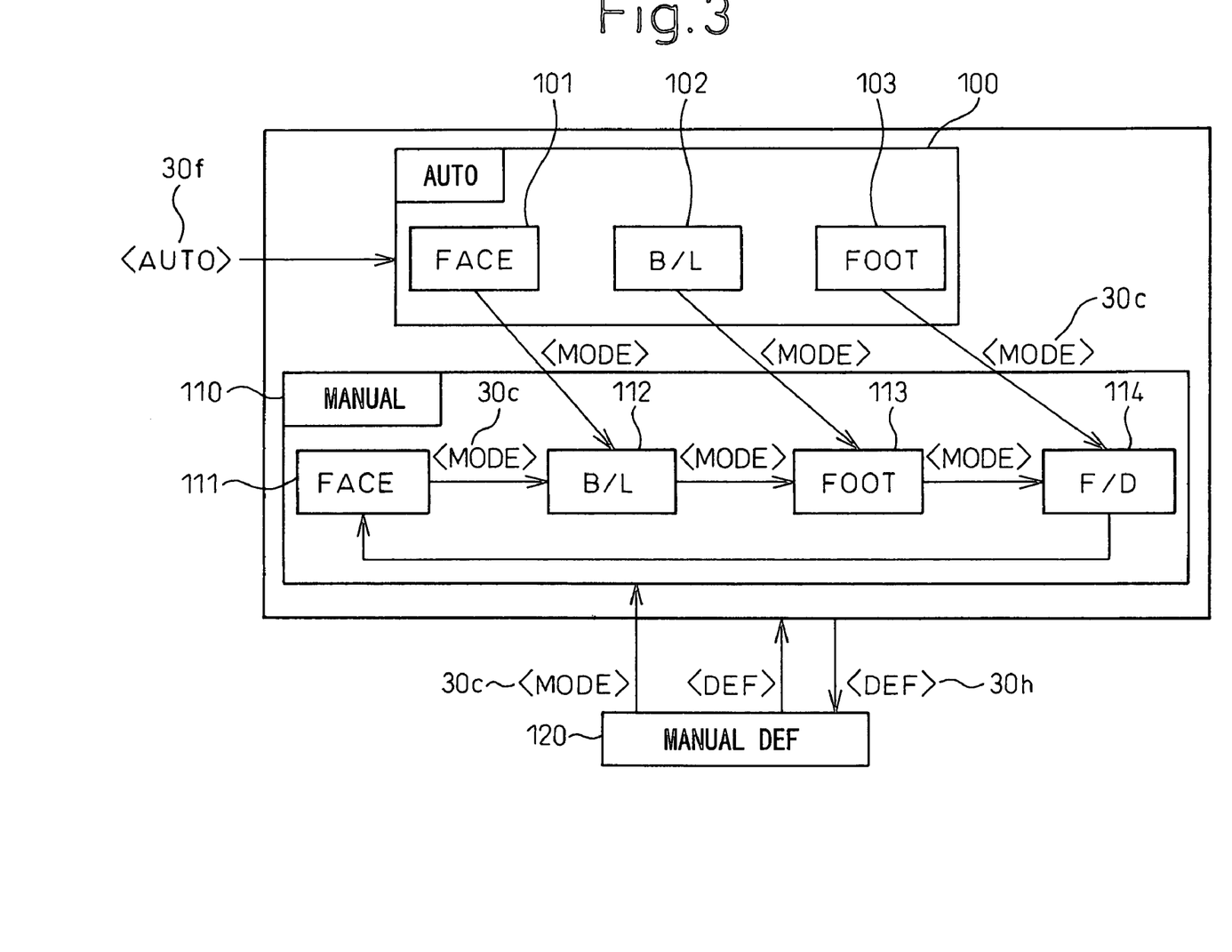
FIG. 3 is a diagram showing the transition of the blow modes.

Next, the order of switching the blow mode by the blow mode switch 30c and the front DEF switch 30h is explained. FIG. 3 is a diagram showing the transition of the blow mode in each block. In FIG. 3, <AUTO> designates the operation of the auto switch 30f, <MODE> one operation of the blow mode switch 30c, and <DEF> one operation of the front DEF switch 30h.

First, the auto mode 100 is started by manipulating the auto switch 30f (<AUTO>) on the air-conditioning operation panel 30, and based on the target blow temperature TAO described later, the blow mode is set automatically to FACE 101, B/L 102 or FOOT 103. During the operation of the auto mode 100, the occupant manipulates the blow mode switch 30c once (<MODE>). Then, in accordance with the blow mode shown in the auto mode 100, each blow mode is realized by the manual mode 110 as indicated by arrows in FIG. 3. In other words, the transition occurs from FACE 101 to B/L 112, from B/L 102 to FOOT 113 and from FOOT 103 to F/D 114.

The manual blow mode 110 is set to switch FACE 111, B/L 112, FOOT 113 and F/D 114 in that order. Each time the blow mode switch 30c is manipulated (<MODE>), these four blow modes are cyclically switched in that order.

Once the front DEF switch 30h is manipulated (<DEF>), on the other hand, the auto mode 100 and the manual mode 110 are forcibly changed to DEF mode ("manual DEF" in FIG. 3) 120. At the same time, the blow mode before the change is stored temporarily.

During the operation in DEF mode 120, the immediately preceding operation mode (auto mode or one of the four blow modes in manual mode 110) is restored by the operation (<DEF>) of the front DEF switch 30h. Also, by the operation (<MODE>) of the blow mode switch 30c during the operation in DEF mode 120, the blow mode is transitioned into one of the blow modes 111 to 114, which is a destination of the transition of the blow mode, in the case when the blow mode switch 30c is operated by the occupant, in a stage of one of the blow modes 111 to 114 of the immediately preceding manual mode 110 or one of the blow modes 101 to 103 of the immediately preceding auto mode 100. Incidentally, upon the manipulation of the auto switch 30f during the operation in DEF mode 120 (<AUTO>), the auto mode 100 is restored in spite of the immediately preceding operation.

As described above, the blow modes including FACE 101, 111, B/L 102, 112, FOOT 103, 113, F/D 114 and DEF 120 are switched appropriately by the operation of the auto switch 30f, the blow mode switch 30c and the front DEF switch 30f. Each blow mode shown in FIG. 3 represents the air blow state from the openings 15, 16, 17 based on the open/close state of the blow mode doors 15a, 16a, 17a and not related to the blow temperature and air capacity.

Figure 4:
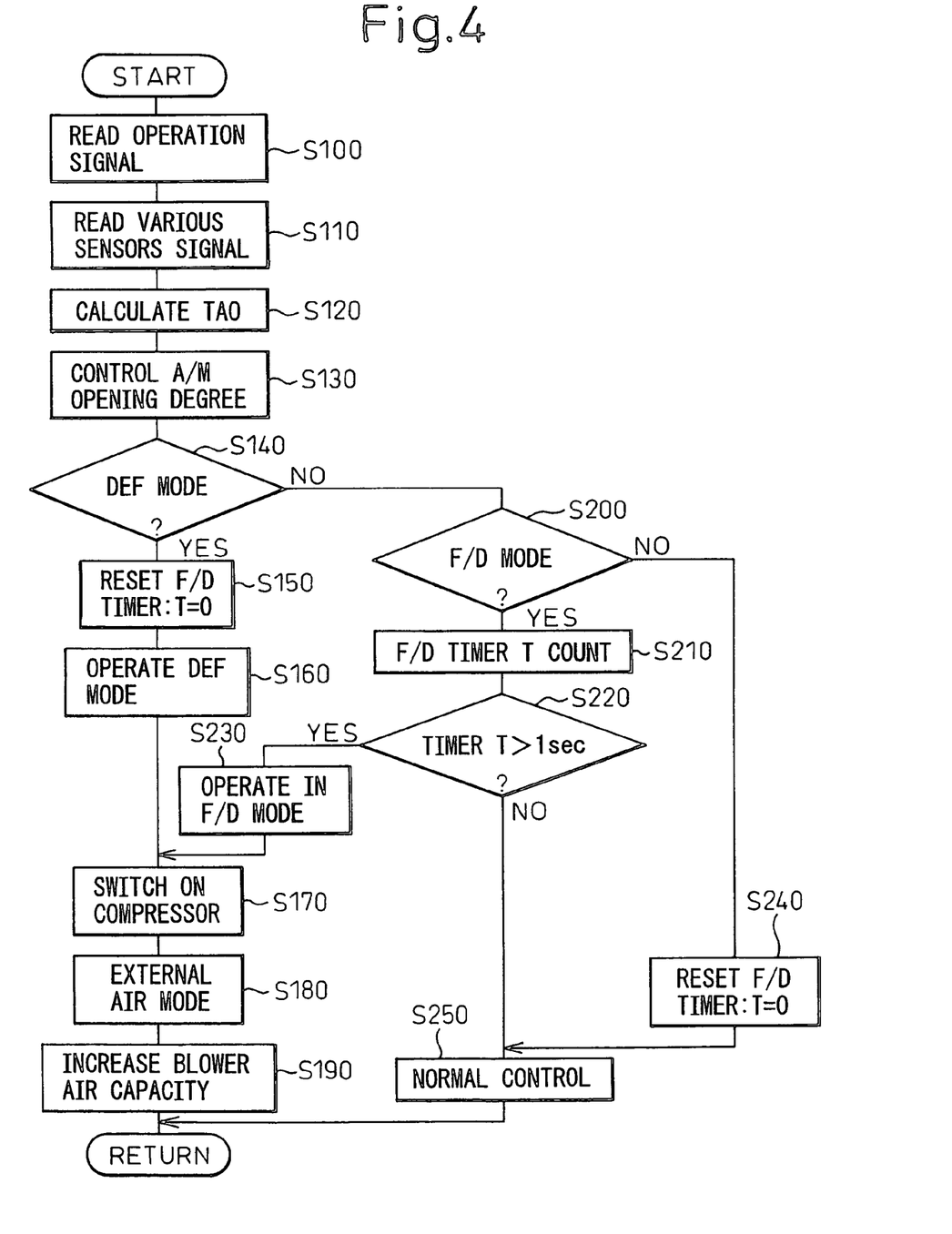
FIG. 4 is a flowchart showing the control routine executed by an air condition control unit.

Next, the operation according to this embodiment having the aforementioned configuration is explained. FIG. 4 is a flowchart showing the control routine executed by the microcomputer of the air-conditioning control unit 22 shown in FIG. 4. The control routine shown in FIG. 4 is started by turning on the auto switch 30f of the air-conditioning operation panel 30 with the vehicle engine ignition switch 39 turned to supply electric power to the air condition control unit 22.

First, the flag, timer, etc. are initialized, and then the operation signal of each operation member (switch) of the air-conditioning operation panel 30 is read at step S100. Then, the detection signals from the sensors 23 to 27 are read at step S110.

Then, at step S120, the target blow temperature TAO of the air-conditioning air blown into the compartments is calculated based on Equation 1 below. This target blow temperature TAO is required to maintain the compartments at the set temperature Tset by the temperature setting switch 30d regardless of the change in the air-conditioning heat load.

$$TAO = Kset \times Tset - Kr \times Tr - Kam \times Tam - Ks \times Ts + C \quad (1)$$

where Tr is the internal air temperature detected by the internal air sensor 24, Tam the external air temperature detected by the external air sensor 25, Ts the sunlight amount detected by the sunlight sensor 26, Kset, Kr, Kam, Ks gains, and C a correction constant.

Next, at step S130, the target opening degree (A/M opening degree) of the air mix door 14 is calculated according to Equation 2, and the air mix door 14 is driven to the position of the target opening degree SW.

$$SW = \{(TAO - Te)/(Tw - Te)\} \times 100(\%) \quad (2)$$

where Te is the evaporator blow temperature detected by an evaporator temperature sensor 27, and Tw the heater core hot water temperature detected by the hot water temperature sensor 23.

At the next step S140, it is determined whether the blow mode is set to DEF 120 (FIG. 3) or not, and in the case where the blow mode is set to DEF 120, the F/D timer in the computer of the air-condition control unit 22 is reset at step S150 (T=0), and the DEF mode operation performed at step S160. At step S160, the blow mode is switched to DEF mode, while at the same time displaying the DEF mode in the blow mode display 31c and the front DEF switch 30h.

After that, the compressor 40 is activated by the electromagnetic clutch 41 as an air-conditioning operation in DEF mode 120 at step S170, the internal-external air switching door 4 making up an internal-external air switching means is turned to external air at step S180, and the blower air capacity of the blow fan 9 is increased at step S190. At step S190, the blower air capacity is increased to a target value which is a predetermined air capacity or the present air capacity, whichever is larger.

In the case where it is determined at step S140 that the blow mode is not set to DEF 120, it is determined at step S200 whether the blow mode is set to F/D 114 (FIG. 3) or not. In the case where it is determined that the blow mode is not set to F/D 114, the F/D timer is reset (T=0) at step S240, and the process proceeds to step S250, at which the normal control operation is performed. That is to say, the operation is conducted in each blow mode of FACE 101, 111, B/L 102, 112 or FOOT 103, 113 in auto mode 100 or manual mode 110.

In the case where it is determined at step S200 that the blow mode is set to F/D 114, the F/D timer begins counting at step S210, and when the count on the F/D timer exceeds one second (T>1 sec) at step S220, the F/D mode operation is performed at step S230. At step S230, the blow mode is switched to F/D mode while at the same time displaying the F/D mode in the blow mode display 31c.

In the case where the count on the F/D timer fails to exceed one second at step S220, on the other hand, the process proceeds to step S250. In this case, step S250 represents the F/D mode 114 to which the blow mode is set at step S200. Thus, the blow mode before switching to F/D mode 114, i.e. the operation in FOOT mode 103, 113 is continued.

After that, as in the air-conditioning operation in DEF mode 120, the air-conditioning operation in F/D mode 114 is performed at step S170 in such a manner that the compressor 40 is activated by the electromagnetic clutch 41, the internal-external switching door 4 making up an internal-external air switching means is turned to the external air at step S180, and the blower air capacity of the blow fan 9 is increased at step S190.

Specifically, according to this embodiment, after reading various signals at the start of the control routine, the target blow temperature TAO is calculated, and in accordance with this TAO, the opening degree of the air mix door 14 is controlled. After that, the occupant operates the switch on the air-conditioning operation panel 30, with the result that as long as the blow mode is set to DEF mode 120, the air-conditioning operation is immediately started in DEF mode. In the case where the blow mode is set to F/D 114, on the other hand, the air-conditioning operation is started in F/D mode after the lapse of the counting time (one second) of the F/D timer. During the counting by the F/D timer, the air-conditioning operation and the display on a display means are suspended in F/D mode 114.

In the case where the blow mode is set to neither DEF 120 nor F/D 114, the F/D timer is reset and the normal control operation is performed in auto mode 100 or manual mode 110.

Figure 5:
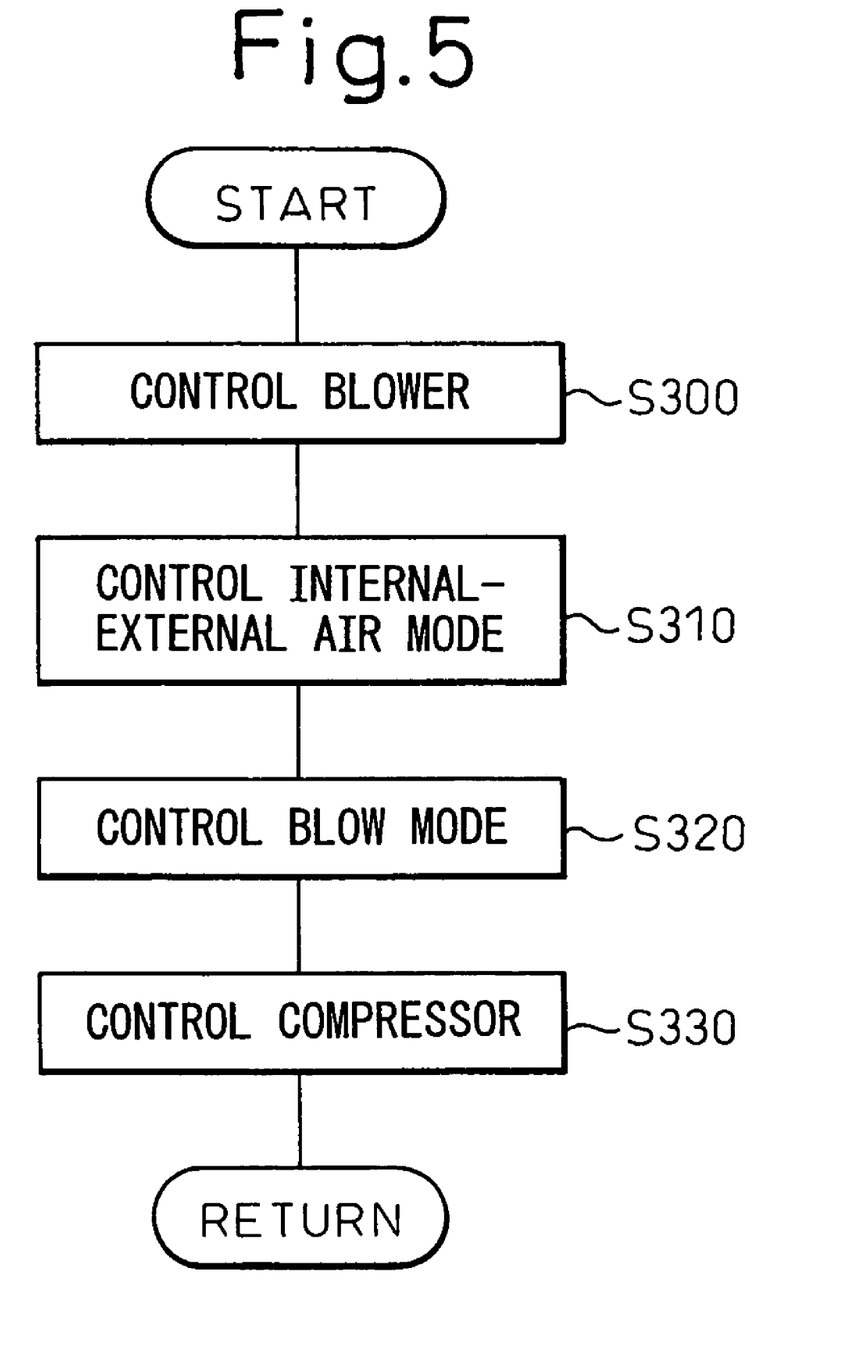
FIG. 5 is a flowchart showing the control routine of the normal control operation.

Next, the normal control routine at step S250 is explained with reference to the flowchart of FIG. 5.

Figure 6A:
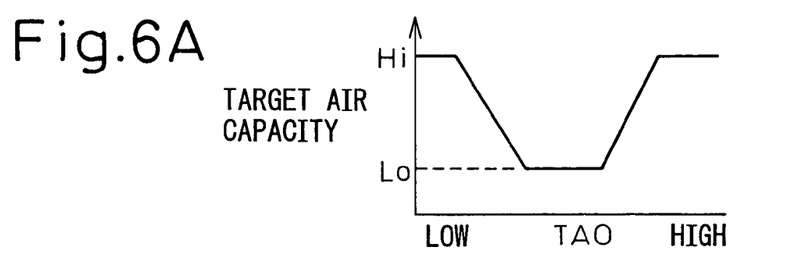
FIGS. 6A to 6D are diagrams showing the air condition control characteristic of the normal control operation.

In normal control operation, the target air capacity BLW of the air blown by the blow fan 9 is calculated based on the target blow temperature TAO at step S300. In accordance with the target blow temperature TAO, as shown in FIG. 6A, the target air capacity BLW is increased (Hi) on high temperature side (maximum heating side) and low temperature side (maximum cooling side) of TAO, while it is decreased (Lo) in the intermediate temperature range of TAO. The control signal of the target air capacity BLW thus calculated is output to a drive circuit 37, whereby the applied voltage corresponding to the target air capacity BLW is output to a blower drive motor 10.

Figure 6B:
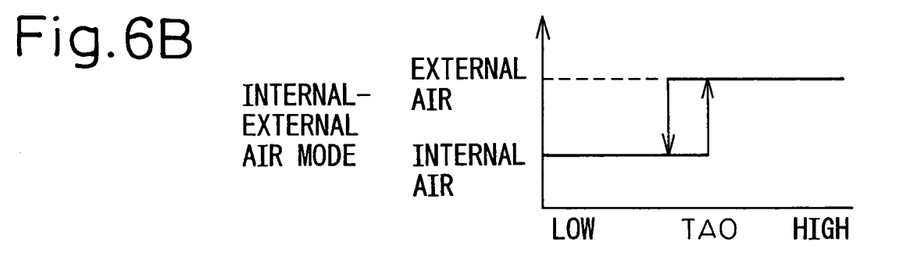

Next, the internal-external air mode (inlet mode) is determined at step S310, and the internal-external air switching door 4 is driven to the position associated with the internal-external air mode thus determined. The internal-external air mode is basically determined in accordance with the target blow temperature TAO described above. Specifically, as shown in FIG. 6B, the internal mode is set on low-temperature side of TAO, and the external mode on high-temperature side of TAO. In the case where the internal-external air switch 30e of the air-conditioning operation panel 30 is manipulated by the occupant to set the internal-external air mode manually, however, the particular mode set manually is determined as an internal-external air mode.

Figure 6C:
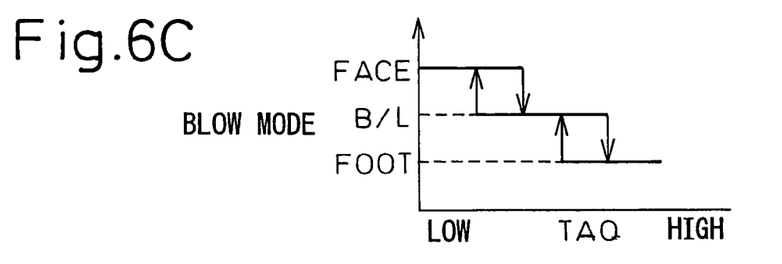

Next, the blow mode is determined at step S320, and the blow mode doors 15a, 16a, 17a are driven to the position associated with the blow mode thus determined. In this case, the blow mode is determined in accordance with the target blow temperature TAO. Specifically, as shown in FIG. 6C, with the increase of TAO from low-temperature to high-temperature side, the blow mode is switched to FACE, B/L and FOOT in that order.

In the case where the occupant operates the blow mode switch 30c and thus manually sets the blow mode to the manual mode 110 as shown in FIG. 3, however, the particular mode (FACE 111, B/L 112, FOOT 113) manually set is determined as a blow mode.

Figure 6D:
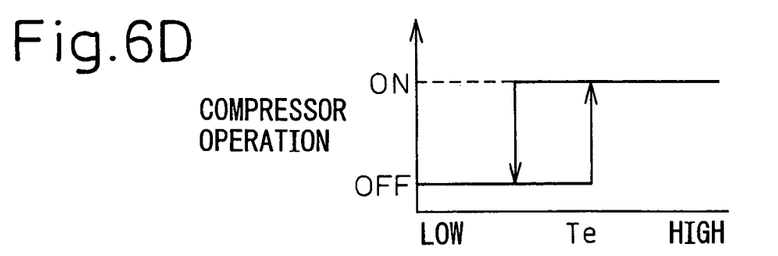

At step S330, the on/off operation of the compressor 40 is determined, and the resulting control signal is output to the drive circuit 38. Thus, the electric current supplied to the electromagnetic clutch 41 is turned on or off by the drive circuit 38. The operation of the compressor is switched on or off, as shown in FIG. 6D, in such a manner that the target evaporator blow temperature TEO is compared with the actual evaporator blow temperature Te, and when the evaporator blow temperature Te drops below the target evaporator blow temperature TEO, the compressor 40 is stopped (turned off), while in the case where the evaporator blow temperature Te rises beyond the target evaporator blow temperature TEO, on the other hand, the compressor 40 is switched on. The target evaporator blow temperature TEO may be either a predetermined fixed value (say, 3 to 4° C.) or a variable amount as calculated in accordance with the environmental conditions of the vehicle. The normal control operation is performed by the process described above.

As described above, according to this embodiment, as long as the blow mode is set to DEF mode 120, the compressor 40 is immediately switched on and the external air mode is introduced, while at the same time increasing the air capacity to clear the window frost quickly. In the case where the blow mode is set to F/D 114, on the other hand, the compressor is turned on while at the same time switching to the external air mode, as in DEF mode 120, to clear the window frost after the lapse of a predetermined time (say, one second) on the count of the F/D timer.

In other words, the operation of the front DEF switch 30h for setting the blow mode to DEF 120 functions independently and reflects the intention of the occupant to change the blow mode to DEF 120. As in this embodiment, therefore, the air condition control operation is required to be conducted in DEF mode 120 immediately after switch operation. The F/D mode 114 is selected, on the other hand, not necessarily by the intention of the occupant. Specifically, even in the case where a blow mode other than the F/D mode 114 is desired by depressing one blow mode switch 30c a plurality of times, the F/D mode 114 may be selected as the result of being passed therethrough by the mode setting operation.

In the case where the B/L mode 112 prevails, the occupant desirous of changing to the FACE mode 111 depresses the blow mode switch 30c three times. Specifically, as shown in FIG. 3, the blow mode is required to be changed from B/L 112 to FOOT 113 to F/D 114 to FACE 111. According to this embodiment, the F/D timer is reset at the time of transition from F/D 114 to FACE 111, and therefore the compressor is not turned on or otherwise controlled. Also, a flicker of each display on the air-conditioning operation panel 30 can be prevented.

OTHER EMBODIMENTS

Figure 7A:
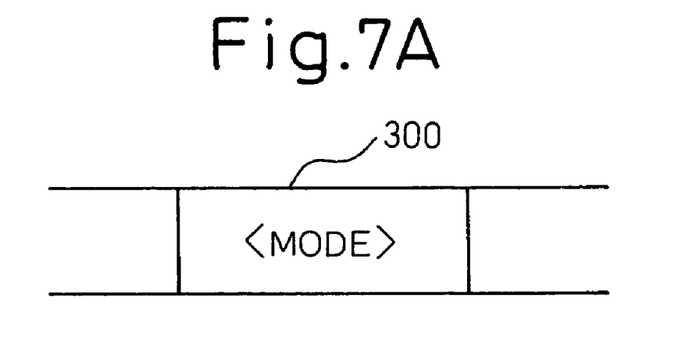
FIGS. 7A and 7B are diagrams showing other embodiments of the invention.
Figure 7B:
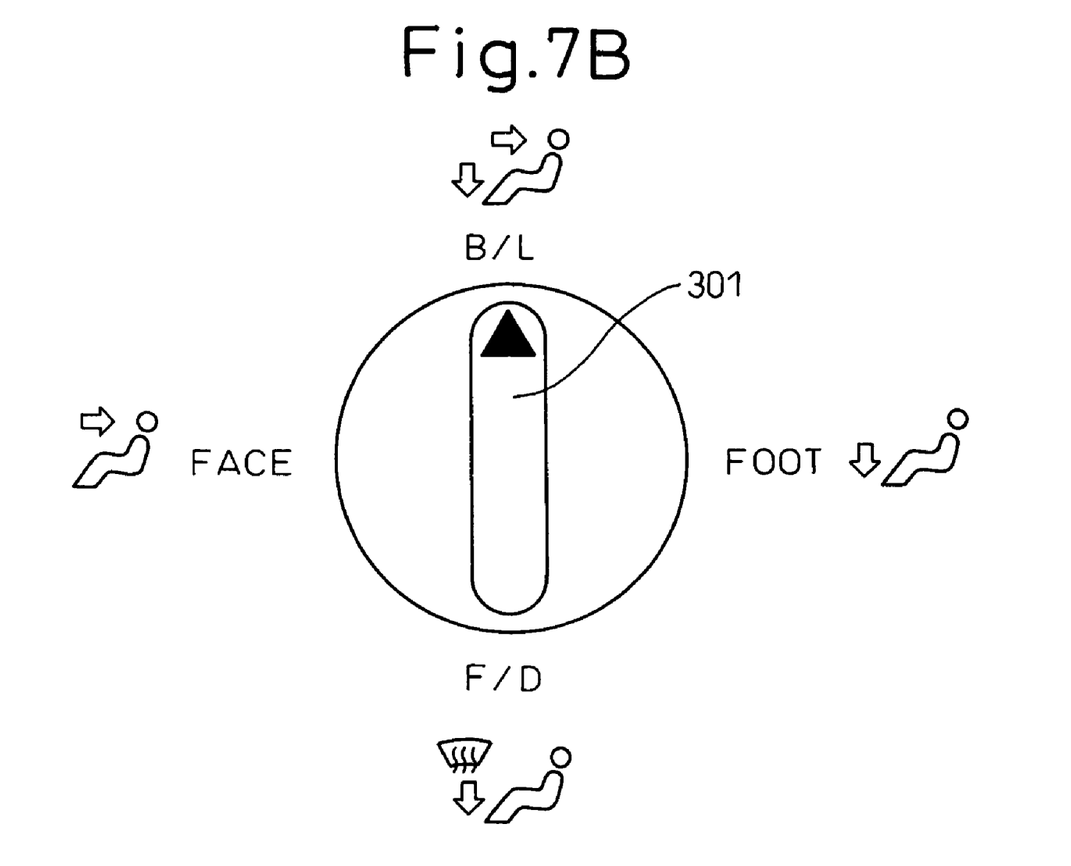

In the embodiment described above, the blow mode switch 30c is of depression type, and each switching operation thereof switches the blow mode sequentially in one direction in accordance with a preset order. This invention, however, is not necessarily limited to this operation, and as shown in FIGS. 7A, 7B, a switch which can be turned in two opposite directions can be used with equal effect. Specifically, as shown in FIG. 7A, each time the right side of a seesaw switch 300 is depressed, the blow mode is switched in positive direction of sequence (FACE to B/L to FOOT to F/D to FACE), while each left side depression switches the mode in the opposite direction (FACE to F/D to FOOT to B/L to FACE). As an alternative, as shown in FIG. 7B, a rotary dial switch 301 may be employed, in which case the blow modes are indicated in characters or patterns on the outer peripheral portion of the dial switch 301, thereby eliminating the use of a special display means.

According to the embodiments described above, the desired blow mode is selected from a plurality of blow modes by operating a single blow mode switch 30c. Nevertheless, an exclusive setting switch may be provided for each of the blow modes (FACE, B/L, FOOT, F/D). In this case, assume that the occupant erroneously operates the F/D mode setting switch, and also operates the blow mode setting switch other than the desired one within the F/D timer counting period. Then, as in the aforementioned embodiments, the F/D timer functions to suspend the air-conditioning operation in F/D mode.

While this invention has been described by reference to specific embodiments chosen for purposes of illustration, it should be apparent that numerous modifications could be made thereto, by those skilled in the art, without departing from the basic concept and scope of the invention.

The invention claimed is:

1. An air conditioner for automotive vehicle use comprising:
    an air path for blowing air into the compartments by a blower;
    an internal-external air switching means for introducing by switching the internal and the external airs into the air path;
    a heat exchanger for cooling the air blown by the blower in the air path;
    a plurality of blow mode switching means for switching a plurality of blow modes by opening and closing a plurality of openings for blowing air into the compartments from the air path;
    a blow mode setting means for allowing an occupant to selectively set the blow mode; and
    an air condition control unit for driving the blow mode switching means based on the blow mode set;
    wherein the blow modes include a foot-defroster mode in which air is blown from both a foot opening toward the feet of the occupants in the compartments and a defroster opening toward the vehicle window glasses, and the blower and at least one of the internal-external air switching means and the heat exchanger are controlled in an operatively interlocked relation with each other; and
    wherein the air condition control unit executes the control operation in foot-defroster mode upon lapse of a predetermined time length from the time point when the foot-defroster mode is set by the blow mode setting means.

2. An air conditioner for automotive vehicle use according to claim 1,
    wherein the blow mode setting means includes a display means for the occupant to recognize the set blow mode, and
    wherein the display means displays the foot-defroster mode after the lapse of the predetermined time length from the time point when the foot-defroster mode is set.

3. An air conditioner for automotive vehicle use according to claim 1,
    wherein the foot-defroster mode and the other blow modes are switched in a predetermined sequence, and
    wherein the blow mode setting means switches the blow mode in accordance with the switching sequence for each input operation of the occupant.

4. An air conditioner for automotive vehicle use according to claim 1,
    wherein the foot-defroster mode and the other blow modes are set in a predetermined sequence, and
    wherein the blow mode setting means includes a bilateral switch for switching the blow mode in accordance with the switching sequence for each input operation in one direction by the occupant, while switching the blow mode in the opposite direction to the switching sequence for each input operation in the other direction by the occupant.

* * * * *

UNITED STATES PATENT AND TRADEMARK OFFICE
CERTIFICATE OF CORRECTION

| | |
|---|---|
| PATENT NO. | : 7,404,435 B2 |
| APPLICATION NO. | : 11/190164 |
| DATED | : July 29, 2008 |
| INVENTOR(S) | : Katsuhiko Samukawa et al. |

It is certified that error appears in the above-identified patent and that said Letters Patent is hereby corrected as shown below:

On the Title Page, Abstract Item (57), lines 11-19 should be deleted and replaced with:
When the F/D mode is selected, the air condition control operation is not performed nor is the blow mode displayed in the F/D mode before the lapse of the predetermined length of time (about 1 second). Therefore, when a blow mode other than the F/D mode is desired, the control operation in the F/D mode is not required and not performed and the instantaneous change is not displayed even though the F/D mode is unavoidably passed-through.

Col. 9, line 41, claim 1, delete "the compartments" and replace with
--a compartment of the vehicle--;

Col. 9, line 43, claim 1, delete "an"

Col. 9, line 43, claim 1, after "following" insert --air--

Col. 9, line 44, claim 1, delete "the internal and the external airs" and replace with
--internal and external air--

Col. 9, line 46, claim 1, delete "in" and replace with --into--

Col. 10, line 1, claim 1, delete "a plurality of"

Col. 10, line 3, claim 1, delete "compartments" and replace with
--compartment of the vehicle--

Col. 10, line 5, line 1, delete "a"

Signed and Sealed this
Fifteenth Day of March, 2011

David J. Kappos
*Director of the United States Patent and Trademark Office*

CERTIFICATE OF CORRECTION (continued)
U.S. Pat. No. 7,404,435 B2

Col. 10, line 6, line 1, delete "the" and replace with --at least one--

Col. 10, line 7, line 1, delete "condition" and replace with --conditioner--

Col. 10, line 8, line 1, delete "blow mode set" and replace with --set blow mold--

Col. 10, line 11, claim 1, delete "the occupants in the compartments" and replace with --an occupant in the compartment of the vehicle--

Col. 10, line 12, claim 1, delete "toward" and replace with --in which air is blown towards--

Col. 10, line 12, claim 1, delete "glasses" and replace with --glass--

Col. 10, line 17, claim 1, delete "condition" and replace with --conditioner--

Col. 10, line 17, claim 1, delete "executes" and replace with --is configured to execute a--

Col. 10, line 18, claim 1, after "in" insert --the--

Col. 10, line 19, claim 1, delete "the" and replace with --a--

Col. 10, line 21, claim 2, delete "An" and replace with --The--

Col. 10, line 23, claim 2, delete "a"

Col. 10, line 24, claim 2, delete "recognize" and replace with --identify--

Col. 10, line 29, claim 3, delete "An" and replace with --The--

Col. 10, line 34, claim 3, before "switching" insert --predetermined--

Col. 10, line 36, claim 4, delete "An" and replace with --The--

Col. 10, line 41, claim 4, before "switching" insert --predetermined--

Col. 10, line 44, claim 4, before "switching" insert --predetermined--